(12) United States Patent
Lee et al.

(10) Patent No.: US 12,101,175 B2
(45) Date of Patent: Sep. 24, 2024

(54) WIRELESS COMMUNICATION DEVICE AND METHOD

(71) Applicant: REALTEK SEMICONDUCTOR CORPORATION, Hsinchu (TW)

(72) Inventors: Wen-Yung Lee, Hsinchu (TW); Shau-Yu Cheng, Hsinchu (TW); Jhe-Yi Lin, Hsinchu (TW); Chun-Kai Tseng, Hsinchu (TW); Wei-Hsuan Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 306 days.

(21) Appl. No.: 17/692,439

(22) Filed: Mar. 11, 2022

(65) Prior Publication Data

US 2022/0303045 A1    Sep. 22, 2022

(30) Foreign Application Priority Data

Mar. 16, 2021    (TW) .................................. 110109362

(51) Int. Cl.
*H04L 1/00* (2006.01)
*H04W 52/14* (2009.01)
(Continued)

(52) U.S. Cl.
CPC .......... *H04L 1/0003* (2013.01); *H04L 1/0026* (2013.01); *H04L 1/0072* (2013.01);
(Continued)

(58) Field of Classification Search
CPC ... H04L 1/0003; H04L 1/0026; H04L 1/0072; H04L 1/0009; H04W 52/365; H04W 52/146; H04W 52/242; H04W 84/12
See application file for complete search history.

(56) References Cited

U.S. PATENT DOCUMENTS 9,252,932 B2 * 2/2016 Gao .................... H04L 5/0035
9,924,525 B2 * 3/2018 Sadiq .................. H04W 52/18
(Continued)

OTHER PUBLICATIONS

OA letter of the counterpart TW application (appl. No. 110109362) mailed on Jan. 12, 2022.

*Primary Examiner* — Rasheed Gidado
(74) *Attorney, Agent, or Firm* — WPAT, P.C

(57) ABSTRACT

A wireless communication method for optimizing uplink transmission from a communication partner to a wireless communication device includes the following steps: after receiving an uplink performance estimation, determining uplink adjustment information including resource unit allocation and a target received signal strength indicator according to the uplink performance estimation; generating a target channel quality indicator (CQI) according to previous uplink sounding information and the uplink adjustment information, wherein the previous uplink sounding information indicates the characteristics of the uplink transmission; determining uplink transmission setting including a modulation and coding scheme and dual carrier modulation according to the target CQI and the type of an error correction technique and transmitting a control signal to a communication partner according to the uplink transmission setting; and updating the uplink performance estimation according to a reception signal from the communication partner, wherein the characteristic of the reception signal is affected by the uplink transmission setting.

17 Claims, 4 Drawing Sheets

(51) Int. Cl.
*H04W 52/36* (2009.01)
*H04W 84/12* (2009.01)

(52) U.S. Cl.
CPC ....... *H04W 52/146* (2013.01); *H04W 52/365* (2013.01); *H04W 84/12* (2013.01)

(56) References Cited

U.S. PATENT DOCUMENTS

| | | | |
|---|---|---|---|
| 11,316,648 B2* | 4/2022 | Vincent | H04L 5/14 |
| 2007/0047502 A1* | 3/2007 | Marinier | H04L 1/0026 370/335 |
| 2017/0272138 A1* | 9/2017 | Chun | H04L 1/1614 |
| 2017/0273112 A1* | 9/2017 | Lou | H04W 74/0808 |
| 2019/0021106 A1* | 1/2019 | Oteri | H04W 72/21 |

* cited by examiner

WIRELESS COMMUNICATION DEVICE AND METHOD

BACKGROUND OF THE INVENTION

1. Field of the Invention

The present disclosure relates to a communication device and method, especially to a wireless communication device and method.

2. Description of Related Art

A new generation wireless local area network (WLAN) standard (e.g., IEEE 802.ax) incorporates the feedback of channel quality indicator (CQI) through a sounding protocol. A CQI is in the form of an array, and each element in this array is indicative of the signal-to-noise ratio (SNR) of a resource unit (RU). If the bandwidth where the RU is distributed is divided into multiple units and each unit includes 26 tones (i.e., 26 subcarriers, each of which has a specified bandwidth), this kind of units is called RU26. The CQI correlating to the $i^{th}$ RU 26 (i.e., $CQI_i$) is defined as follows:

$$CQI_i = AvgSNR_i = \frac{1}{N_s}\sum_{k=0}^{N_s-1} SNR_{dB}(scidx(k)) = \frac{1}{N_s}\sum_{k=0}^{N_s-1} 10 \quad \text{(eq. 1)}$$

$$\log_{10}(SNR(scidx(k))) = \frac{1}{N_s}\sum_{k=0}^{N_s-1} 10\log_{10}\left(\frac{sigpow(scidx(k))}{NV_i}\right)$$

The definition of each parameter in the eq. 1 is described in Table 1.

TABLE 1

| Parameter | Definition |
| --- | --- |
| $AvgSNR_i$ | the average SNR of the $i^{th}$ RU26, wherein an RU 26 is the minimum RU including 26 subcarriers |
| i | a number denoting the ordinal number of the $i^{th}$ RU26 |
| k | a number denoting the ordinal number of the $k^{th}$ subcarrier included in the $i^{th}$ RU26 |
| scidx(k) | a subcarrier index of the $k^{th}$ subcarrier |
| sigpow(scidx(.)) | the signal power of a subcarrier labeled with a subcarrier index |
| $NV_i$ | the total noise power of the $i^{th}$ RU26 |
| $N_S$ | the total number of subcarriers of the $i^{th}$ RU26 |

When CQI is applied to the function of modulation and coding scheme adaptation (MCS adaptation), the function can translate the value of a CQI into an MCS of this CQI's corresponding RU to let an access point (AP) choose an appropriate MCS; in this way the number of attempts to find out an optimal transmission rate can be reduced, the duration of the adjustment in the transmission rate can be shortened, and the system performance of the AP can be improved.

The IEEE 802.11ax standard merely defines the CQI sounding for downlink (DL), but leaves the CQI sounding for uplink (UL) undefined. In this technical field, the uplink means the transmission from a non-AP station to an AP and the downlink means the transmission from an AP to a non-AP station. In regard to the CQI sounding for the downlink, a station (STA) generates a CQI according to a signal transmitted from an AP, and then the STA reports the CQI to the AP. As to the CQI sounding for the uplink, although the IEEE 802.11ax standard mentions an uplink closed-loop power control, this control does not make use of any CQI. The uplink closed-loop power control includes: in an uplink Orthogonal Frequency Division Multiple Access flow (UL OFDMA flow), an AP transmitting a trigger frame to at least one STA first, in which the trigger frame is a control frame rather than a non-control frame (e.g., a data frame or a management frame); a common field of the trigger frame including information indicating AP transmission power (AP Tx power); after receiving the trigger frame, the STA estimating a received signal strength indicator (RSSI), in which the difference between the AP Tx power and the RSSI is treated as path loss (PL); when the STA transmits a high efficiency trigger-based physical layer conformance procedure (PLCP) protocol data unit (HE_T-B_PPDU) to the AP, the STA compensating for the path loss through power adjustment to make the power of the AP's received HE_TB_PPDU conform to an uplink target RSSI (UL target RSSI) specified by a user field of the trigger frame; the media access control header (MAC header) in the HE_TB_PPDU carrying information indicating an uplink power headroom (UL power headroom; UPH) which shows the difference between the current transmission power of the STA and the maximum transmission power of the STA; the MAC header also carrying a minimum flag which shows whether the power of a signal transmitted by the STA reaches the minimum power; and the AP adjusting the AP Tx power and the target RSSI according to the UPH and the minimum flag in the following UL OFDMA flow, and thereby achieving the effect of the uplink closed-loop power control.

The definition of a CQI and the way to obtain a CQI are known in this technical field. The CQI sounding for downlink and the uplink closed-loop power control are also known in this technical field. The details of these conventional arts are omitted here.

SUMMARY OF THE INVENTION

An object of the present disclosure is to provide a wireless communication device and method. The device and method can improve/optimize uplink transmission with a channel quality indicator (CQI) and cure the deficiency of the prior art.

An embodiment of the wireless communication device of the present disclosure can improve the uplink transmission from a communication partner to the wireless communication device. The wireless communication device includes an uplink setting circuit, a CQI updating circuit, an uplink-transmission-setting decision circuit, and a performance estimation circuit. The uplink setting circuit is configured to receive an uplink performance estimation and then determine uplink adjustment information according to the uplink performance estimation. The CQI updating circuit is configured to generate a target CQI according to previous uplink sounding information and the uplink adjustment information, wherein the previous uplink sounding information indicates a characteristic of the uplink transmission. The uplink-transmission-setting decision circuit is configured to determine uplink transmission setting according to the target CQI and a type of an error correction technique to let the wireless communication device transmit a control signal to the communication partner according to the uplink transmission setting, wherein the wireless communication device adopts the error correction technique and the control signal has an influence on the performance of the uplink transmission between the communication partner and the wireless communication device. The performance estimation circuit is configured to update the uplink performance estimation according to a reception signal from the communication partner. In the above embodiment, the wireless communication device is an access point (AP) and the communication partner is a station (STA).

An embodiment of the wireless communication method of the present disclosure is performed by a wireless communication device. This embodiment can improve the uplink transmission from a communication partner to the wireless communication device, and includes the following steps: receiving an uplink performance estimation and then determining uplink adjustment information according to the uplink performance estimation; generating a target CQI according to previous uplink sounding information and the uplink adjustment information, wherein the previous uplink sounding information indicates a characteristic of the uplink transmission; determining uplink transmission setting according to the target CQI and a type of an error correction technique and thereby transmitting a control signal to the communication partner according to the uplink transmission setting, wherein the error correction technique is applied to the wireless communication device; and updating the uplink performance estimation according to a reception signal from the communication partner, wherein a characteristic of the reception signal is under the influence of the uplink transmission setting.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes a wireless communication device and method. The device and method can improve uplink transmission with a channel quality indicator (CQI).

A current wireless local area network (WLAN) standard (e.g., IEEE 802.11ax) defines downlink (DL) sounding without defining uplink (UL) sounding. The present specification discloses an uplink adjustment flow including: when a wireless communication device concurrently functions as a receiver and a decision-maker (e.g., the device transmitting a control frame) in an uplink transmission flow (e.g., an uplink Orthogonal Frequency Division Multiple Access flow (UL OFDMA flow)), the wireless communication device determining a target CQI according to a channel state information (CSI) of a communication partner, and then determining the content of a control signal (e.g., the content of a common field and a user field of a trigger frame) according to the target CQI; afterward, the wireless communication device 100 transmitting the control signal to the communication partner to request the communication partner to adjust itself according to the control signal, and thereby improving/optimizing the uplink transmission from the communication partner to the wireless communication device. The wireless communication device can perform the uplink adjustment flow one time or several times, or can perform the flow periodically/non-periodically. It should be noted that the CSI can be obtained with a conventional/self-developed channel estimation technique. Since the conventional/self-developed channel estimation technique falls beyond the scope of the present disclosure, its detail is omitted here.

Figure 1:
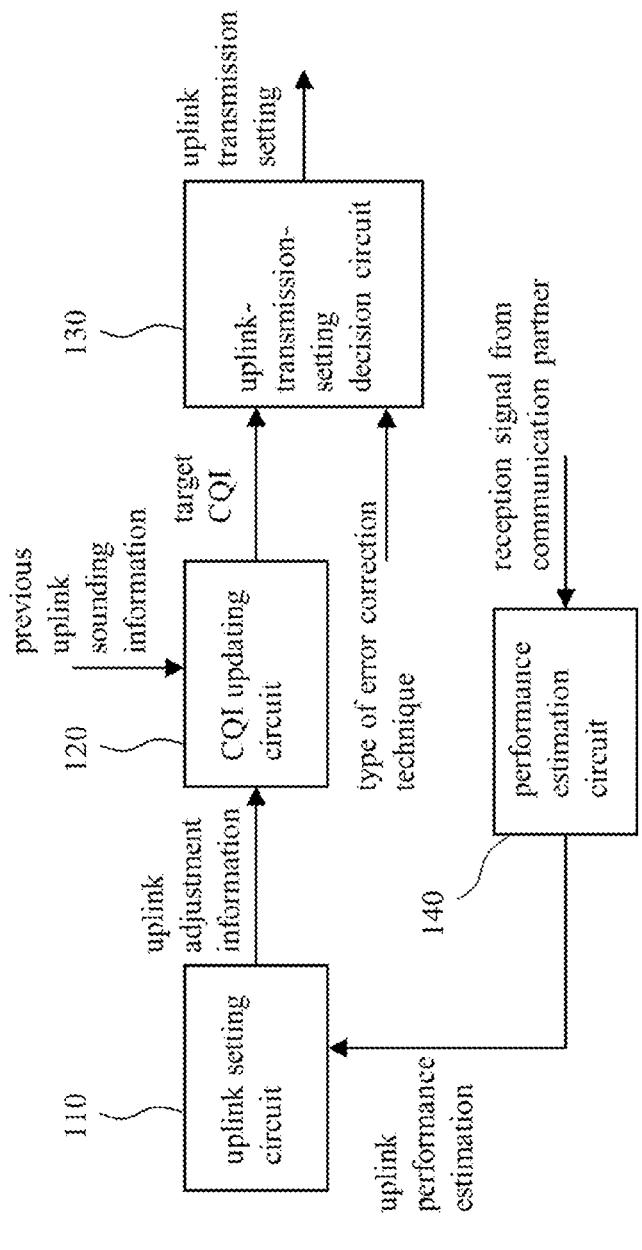
FIG. 1 shows an embodiment of the wireless communication device of the present disclosure.

FIG. 1 shows an embodiment of the wireless communication device of the present disclosure. The wireless communication device 100 of FIG. 1 (e.g., an access point (AP)) includes an uplink setting circuit 110, a CQI updating circuit 120, an uplink-transmission-setting decision circuit 130, and a performance estimation circuit 140. These circuits are descried in the following paragraphs.

The uplink setting circuit 110 is configured to receive an uplink performance estimation provided by the performance estimation circuit 140 and then determine uplink adjustment information according to the uplink performance estimation. An example of the uplink performance estimation includes "the transmission duration of a reception signal (e.g., a physical layer conformance procedure (PLCP) protocol data unit; PPDU) from a communication partner" and/or "the throughput of the uplink transmission from the communication partner to the wireless communication device 100", but the present invention is not limited thereto. An example of the uplink adjustment information includes resource unit allocation (RU allocation) and a target Received Signal Strength Indicator (target RSSI), but the present invention is not limited thereto.

The CQI updating circuit 120 is configured to generate a target CQI according to previous uplink sounding information and the uplink adjustment information. The target CQI includes M values ($\{CQI_i'\}$) correlating to M resource unit(s) (M RU(s)) respectively, wherein the M is a positive integer and the suffix "i" is an integer between 0 and (M−1). An example of the previous uplink sounding information includes a CQI ($\{CQI_i\}$) obtained by the wireless communication device 100 performing uplink sounding last time, and includes an RSSI and a bandwidth (BW) the wireless communication device 100 obtained. The way to obtain a CQI is described a later paragraph.

Figure 2:
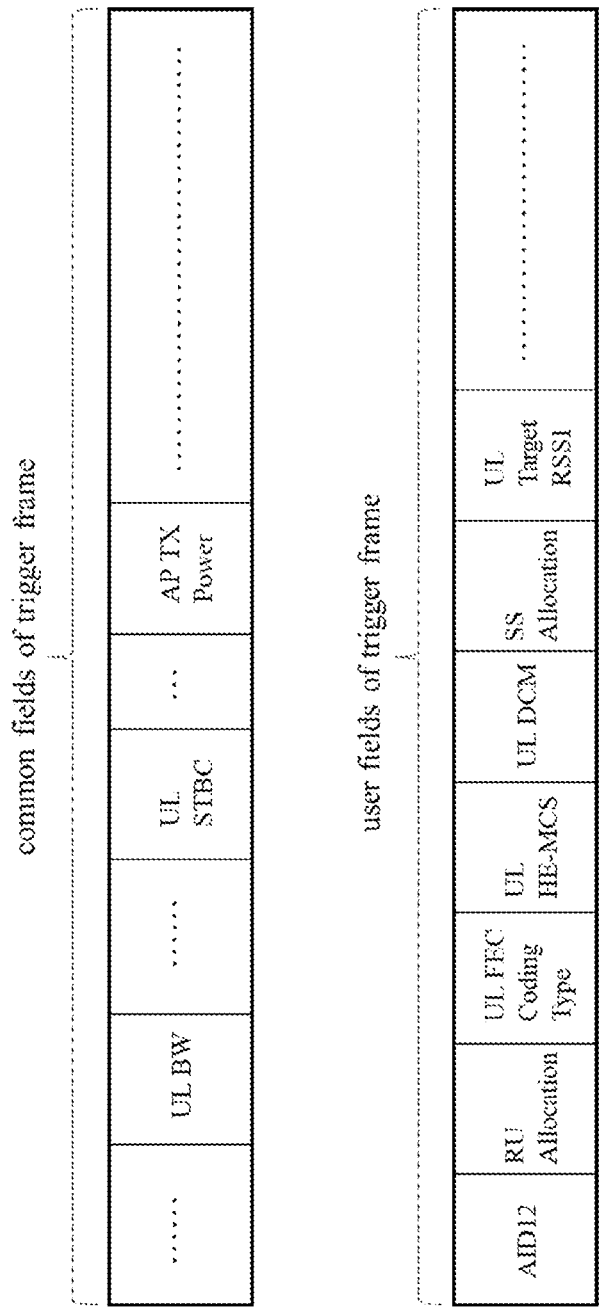
FIG. 2 shows the form of a conventional trigger frame.

The uplink-transmission-setting decision circuit 130 is configured to determine uplink transmission setting according to the target CQI ($\{CQI_i'\}$) and the type of an error correction technique (e.g., a forward error correction (FEC) technique such as the Low Density Parity Check Code (LDPC) or Binary Convolution Code (BCC)) the wireless communication device 100 adopts. In an exemplary implementation, the uplink-transmission-setting decision circuit 130 chooses a modulation and coding scheme (MCS) according to the target CQI and the type of the error correction technique as shown in Table 2, and thereby makes the uplink transmission setting include the MCS. Since the above-mentioned MCS, LDPC, and BCC are common in this technical field, their details are omitted here. After the uplink transmission setting is determined, the wireless communication device 100 determines the content of a control signal (e.g., a trigger frame) according to the uplink transmission setting, and then transmits the control signal to the communication partner (e.g., a non-AP station (non-AP STA)) to request the communication partner to adjust itself according to the control signal. In an exemplary implementation, the form of the control signal is the form of a conventional trigger frame as shown in FIG. 2. FIG. 2 includes common fields and user fields, and the description of these fields is found in Table 3. An example of the content of the control signal includes the content of the field(s)

shown in FIG. 2, but the present invention is not limited thereto. It should be noted that FIG. 2 merely shows a part of the fields of a trigger frame to prevent the interference in the expression of aspects of the present invention.

TABLE 2

| MCS | FEC | target CQI | FEC | target CQI |
|---|---|---|---|---|
| 0 | LDPC | <0 | BCC | <1 |
| 1 | LDPC | <3 | BCC | <4 |
| 2 | LDPC | <5 | BCC | <6 |
| 3 | LDPC | <8 | BCC | <9 |
| 4 | LDPC | <11 | BCC | <12 |
| 5 | LDPC | <14 | BCC | <15 |
| 6 | LDPC | <17 | BCC | <18 |
| 7 | LDPC | <20 | BCC | <21 |
| 8 | LDPC | <23 | BCC | <24 |
| 9 | LDPC | <24 | BCC | <25 |

TABLE 3

| field name | purpose of field |
|---|---|
| UL BW | indicating the bandwidth of an uplink signal |
| UL STBC | indicating whether an uplink signal uses Space-Time Block Code (STBC) |
| AP Tx Power | indicating the power of a wireless communication device (i.e., an AP in this case) transmitting a trigger frame |
| AID12 | indicating this user field being assigned to which STA, and requesting this STA to reply in a specified manner |
| RU Allocation | showing the RU allocation of an uplink signal |
| UL FEC Coding Type | indicating which kind of FEC an uplink signal should adopt |
| UL HE-MCS | indicating which kind of MCS an uplink signal should adopt |
| ULDCM | indicating whether an uplink signal uses Dual Carrier Modulation (DCM) |
| SS Allocation | showing that the allocation of an uplink signal is from one space-time stream (STS) to another STS |
| UL Target RSSI | showing the RSSI of an uplink signal that a wireless communication device (i.e., an AP in this case) expected |

It should be noted that Table 2 is applicable to the transmission using RU26 (the minimum RU including 26 subcarriers) without using Space-Time Block Code (STBC). An RU26 has a bandwidth (2 MHz) narrower than a coherence bandwidth (6.7 MHz) as described in the later paragraph, and Table 2 is established according to the transmission performance under an Additive White Gaussian Noise (AWGN) channel, wherein the transmission performance is usually based on a required SNR (rSNR), that is to say the SNR obtained when the packet error rate is 0.1 and the length of Presentation Service Data Unit (PSDU) is 1000 bytes. Additionally, in regard to a larger RU, other conventional/self-developed translation methods (e.g., Exponential effective SNR mapping (EESM) found in the following document: Jobin Francis, Student Member, IEEE, and Neelesh B. Mehta, Senior Member, IEEE, "EESM-based Link Adaptation in OFDM: Modeling and Analysis", Globecom 2013—Wireless Communications Symposium) can be used to translate a target CQI of this larger RU into a MCS provided that the type of an error correction technique is given.

The performance estimation circuit 140 is configured to generate/update the uplink performance estimation according to a reception signal (e.g., a high efficiency trigger-based physical layer conformance procedure (PLCP) protocol data unit (hereafter referred to as HE_TB_PPDU)) from the communication partner. An example of the reception signal carries information including an uplink power headroom (UPH) and a minimum flag which are common in this technical field as mentioned in the description of related art of the present specification. In the embodiment of FIG. 1, the uplink setting circuit 110 determines the uplink adjustment information according to the uplink performance estimation and optionally according to the information carried by the reception signal; in addition, before the uplink setting circuit 110 receives any uplink performance estimation, the uplink setting circuit 100 can output predetermined information (e.g., predetermined RU allocation and a predetermined target RSSI) as the uplink adjustment information.

The way to obtain a CQI is described below. As shown in FIG. 1, the wireless communication device 100 receives the reception signal of the aforementioned communication partner and accordingly calculates a CQI of the communication partner. In an exemplary implementation, the wireless communication device 100 includes a CQI calculation circuit (not shown) to calculate the CQI; in another exemplary implementation, the CQI updating circuit 120 of the wireless communication device 100 includes the CQI calculation circuit to calculate the CQI. The CQI calculation circuit can be realized with a conventional/self-developed technique which falls beyond the scope of the present disclosure, and thus its detail is omitted here. The calculation of a CQI is found in the aforementioned eq. (1). Since a log function is a concave function, an inequality can be derived from the eq. (1) as shown below:

$$\frac{1}{N_s} \sum_{k=0}^{N_s-1} 10\log_{10}\left(\frac{sigpow(scidx(k))}{NV_i}\right) \leq \qquad \text{eq. (2)}$$

$$10\log_{10}\left(\frac{1}{NV_i}\left(\frac{\sum_{k=0}^{N_s-1} sigpow(scidx(k))}{N_s}\right)\right)$$

The maximum WLAN indoor delay spread approximates 150 ns which is equivalent to a coherence bandwidth (coherence BW) being $$\text{"}\frac{1}{150} =$$

0.0067 GHz = 6.7 MHz > 2 MHz = the signal bandwidth of $RU26$", and thus the variation of a WLAN signal within the bandwidth of 2 MHz is insignificant and approximates the noise of an Additive White Gaussian Noise (AWGN) channel. Accordingly, the left part of the eq. (2) can be approximated to the right part of the eq. (2) as shown in the following eq. (3). The right part of the eq. (3) can be treated as the average signal power (dB) of the $i^{th}$ RU26 minus the signal power (dB) of noise, wherein the term "$NV_i$" is unrelated to the signal transmission end and can be obtained according to long-term statistics of radio-frequency characteristics gathered by a conventional/self-developed circuit of the signal reception end.

$$10\log_{10}\left(\frac{1}{NV_i}\left(\frac{\sum_{k=0}^{N_s-1} sigpow(scidx(k))}{N_s}\right)\right) \approx \qquad \text{eq. (3)}$$

$$10\log_{10}\left(\frac{\sum_{k=0}^{N_s-1} sigpow(scidx(k))}{N_s}\right) - 10\log_{10}(NV_i) =$$

$$10\log_{10}(avgsigpow_i) - 10\log_{10}(NV_i)$$

Figure 3:
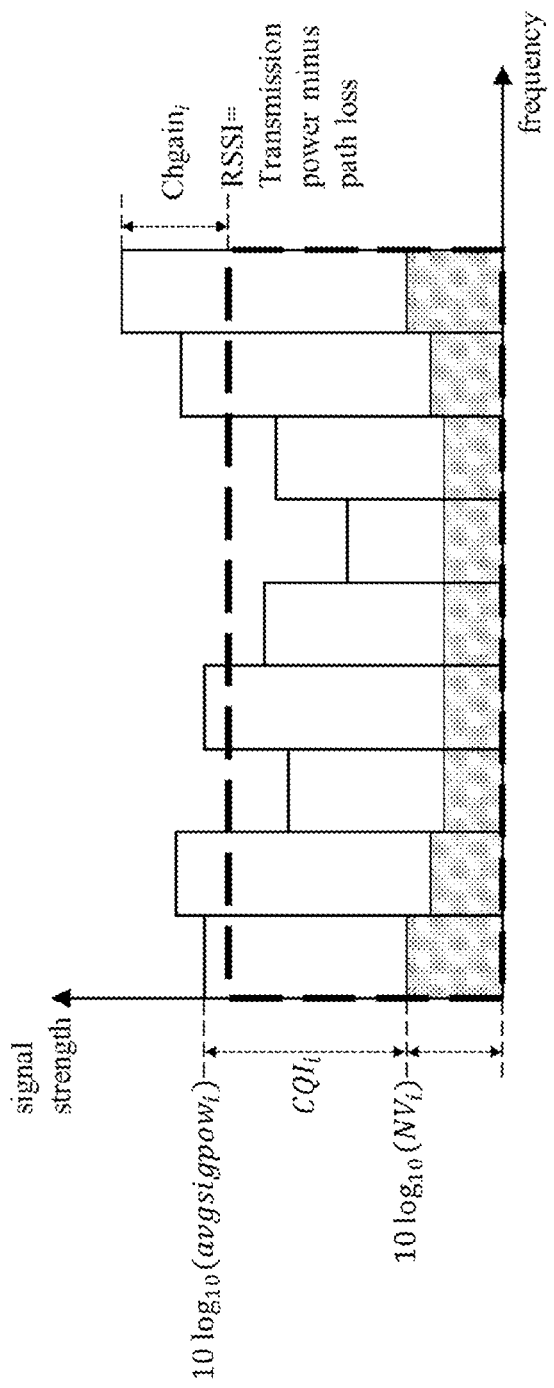
FIG. 3 shows an exemplary calculation result of the channel quality indicator (CQI) of a resource unit.

After the wireless communication device 100 calculates the CQI of the communication partner, the wireless communication device 100 obtains the CQI of each RU26 within the uplink bandwidth of the communication partner. In an exemplary implementation, the wireless communication device 100 receives a physical layer conformance procedure protocol data unit (PPDU) occupying a 20 MHz uplink bandwidth from the communication partner; since the signal bandwidth of one RU26 is 2 MHz, the bandwidth "20 MHz" can be divided into 9 RU26s (distinguished by the aforementioned suffix i=0~8), and the wireless communication device 100 can obtain $\{CQI_i | i \in 0\text{~}8\}$ as shown in FIG. 3. The $CQI_i$ plus the $NV_i$ (dB) (i.e., the dotted part of the bars in FIG. 3) calculated offline will be equal to the signal power of the signal(s) in the $i^{th}$ RU26 (avgsigpow$_i$ (dB)), and the total area of the avgsigpow$_i$ (i=0~8) of all RU26s is illustrated with the dash-line rectangle in FIG. 3. The dash-line rectangle indicates that an average signal power stands for an RSSI, and the RSSI is equivalent to the transmission power of the communication partner minus the path loss (PL). If the uplink setting circuit 110 raises/lowers a target RSSI to request the communication partner to increase/decrease its transmission power, the RSSI of a next reception signal from the communication partner will become higher/lower, which means that the signal strength of the signal(s) in every RU26 in FIG. 3 will become higher/lower simultaneously. In FIG. 3, the difference between the RSSI and the signal power of the $i^{th}$ RU26 (avgsigpow$_i$ (dB)) is equivalent to the channel gain (Chgain$_i$ (dB)) of the $i^{th}$ RU26. Different RU26s are corresponding to different channel gains respectively, and the channel gain of each RU26 will not change in a short period in a stable indoor environment, which allows the wireless communication device 100 to choose an RU26 according to the channel gain it needs.

On the basis of the above-description, providing the other conditions remain unchanged, when the uplink bandwidth decreases/increases, the overall signal transmission should be carried out with a narrower/wider bandwidth; accordingly, the power spectral density (PSD) within the uplink bandwidth increases/decreases and the PSD is inversely proportional to the uplink bandwidth. Besides, providing the other conditions remain unchanged, when the RSSI increases/decreases, the signal strength within the same bandwidth will become strong/weak and thus the PSD will increase/decrease. Furthermore, the allocation of RU(s) can be determined according to the channel gain(s); for example, an RU characterized by a higher channel gain is used for uplink transmission preferentially. In light of the above, the wireless communication device 100 can improve/optimize uplink transmission through the setting of a target RSSI, a target bandwidth, and the allocation of RU(s) of the uplink transmission.

On the basis of the above description, the uplink setting circuit 110 determines the uplink adjustment information according to the uplink performance estimation of the performance estimation circuit 140; the CQI updating circuit 120 determines a target CQI according to the uplink adjustment information and the previous uplink sounding information (e.g., the CQI, RSSI, and bandwidth of the uplink transmission obtained through the latest uplink sounding); the uplink-transmission-setting decision circuit 130 uses the target CQI and other information (e.g., the aforementioned FEC and UPH) to determine the content of the aforementioned control signal (e.g., a trigger frame); afterward, the wireless communication device 100 transmits the control signal to the communication partner to influence the signal power and CQI of the next uplink transmission. In an exemplary implementation, the uplink adjustment information includes a target RSSI (RSSI') and a target bandwidth (BW') as shown in eq. (4), and accordingly the CQI updating circuit 120 generates a target CQI indicating the CQI of the next uplink transmission the wireless communication device 100 expected.

$$\text{avgsigpow}_i' = \text{avgsigpow}_i + (BW - BW') + (RSSI' - RSSI)$$
$$CQI_i' = \text{avgsigpow}_i' - NV_i \qquad \text{eq. (4)}$$

The definitions of the terms in eq. (4) are described in Table 4.

TABLE 4

| term | meaning |
| --- | --- |
| avgsigpow$_i$ | the signal strength (dB) of the signal(s) in the $i^{th}$ RU26 obtained through the current uplink sounding |
| avgsigpow$_i'$ | the signal strength (dB) of the signal(s) in the $i^{th}$ RU26 that the control signal (e.g., a trigger frame) of the wireless communication device 100 expected |
| BW | the signal bandwidth obtained through the current uplink sounding |
| BW' | the signal bandwidth that the control signal of the wireless communication device 100 expected |
| NV$_i$ | the total noise power of the $i^{th}$ RU26 |
| RSSI | the RSSI (dBm) obtained through the current uplink sounding |
| RSSI' | the RSSI (dBm) ("UL Target RSSI + Error") that the control signal of the wireless communication device 100 expected |
| CQI$_i'$ | the CQI (dB) of the $i^{th}$ RU26 that the control signal of the wireless communication device 100 expected |

It should be noted that the target RSSI cannot be increased unlimitedly because the target RSSI is limited to the transmission power capability of the communication partner and the regulations of laws. The communication partner can inform the wireless communication device 100 of the margin of the transmission power through the aforementioned UPH.

According to the above disclosure, the wireless communication device 100 can affect the signal strength of the signal(s) transmitted by the communication partner and affect the CQI of the uplink transmission through the adjustment in the uplink bandwidth, the uplink target RSSI, and the RU allocation. It should be noted that the wireless communication device 100 can communicate with one or more communication partners, and can perform uplink sounding for each communication partner to improve/optimize the uplink transmission between the wireless communication device 100 and the communication partner.

Figure 4:
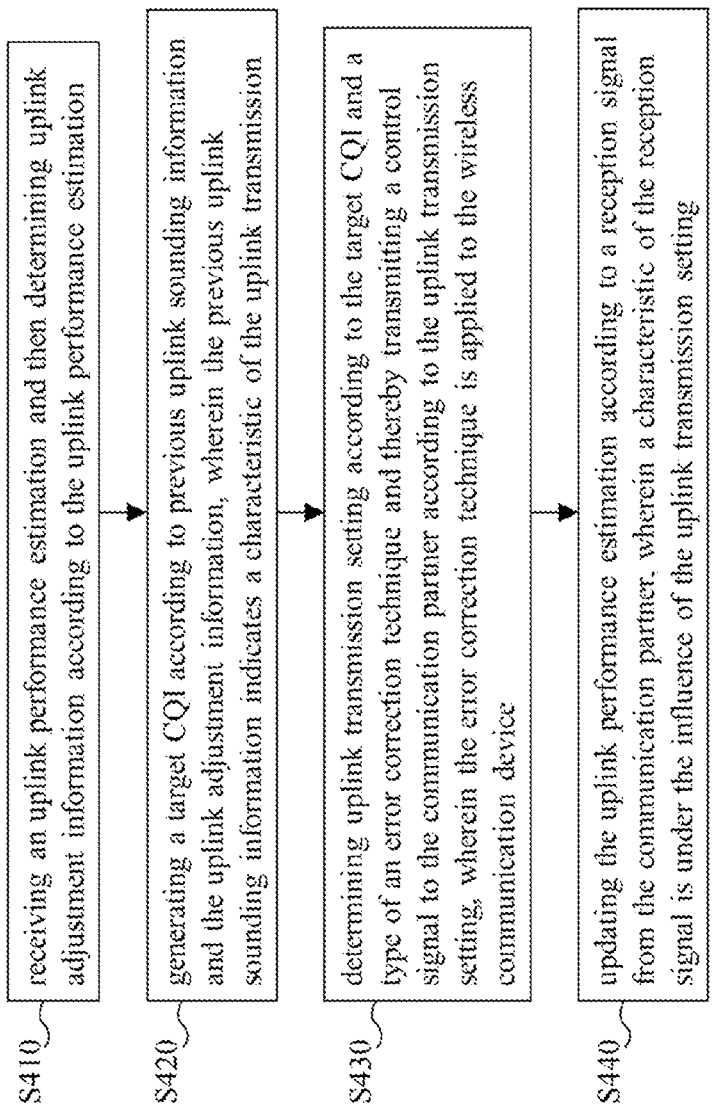
FIG. 4 shows an embodiment of the wireless communication method of the present disclosure.

FIG. 4 shows an embodiment of the wireless communication method of the present disclosure. This embodiment is performed by a wireless communication device (e.g., the wireless communication device 100 of FIG. 1) and can improve/optimize the uplink transmission from a communication partner to the wireless communication device. This embodiment includes the following steps:

S410: receiving an uplink performance estimation and then determining uplink adjustment information according to the uplink performance estimation;

S420: generating a target CQI according to previous uplink sounding information and the uplink adjustment information, wherein the previous uplink sounding information indicates a characteristic of the uplink transmission;

S430: determining uplink transmission setting according to the target CQI and a type of an error correction technique and thereby transmitting a control signal to the communication partner according to the uplink transmission setting, wherein the error correction technique is applied to the wireless communication device; and S440: updating the uplink performance estimation according to a reception signal from the communication partner, wherein a characteristic of the reception signal is under the influence of the uplink transmission setting.

Since those having ordinary skill in the art can refer to the disclosure of the device embodiment to appreciate the detail and modification of the method embodiment, which implies that some or all of the features of the device embodiment can be applied to the method embodiment in a logical way, repeated and redundant description is omitted here.

It should be noted that people having ordinary skill in the art can selectively use some or all of the features of any embodiment in this specification or selectively use some or all of the features of multiple embodiments in this specification to implement the present invention as long as such implementation is practicable; in other words, the present invention can be carried out flexibly.

To sum up, the wireless communication device and method can improve/optimize uplink transmission through uplink sounding.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A wireless communication device capable of improving uplink transmission from a communication partner to the wireless communication device, wherein the wireless communication device is an access point (AP) and the communication partner is a non-AP station (STA), and the wireless communication device comprises:
    an uplink setting circuit configured to receive an uplink performance estimation and then determine uplink adjustment information according to the uplink performance estimation;
    a channel quality indicator (CQI) updating circuit configured to generate a target CQI according to previous uplink sounding information and the uplink adjustment information, wherein the previous uplink sounding information indicates a characteristic of the uplink transmission;
    an uplink-transmission-setting decision circuit configured to determine uplink transmission setting according to the target CQI and a type of an error correction technique to let the wireless communication device transmit a control signal to the communication partner according to the uplink transmission setting, wherein the wireless communication device adopts the error correction technique and the control signal has an influence on performance of the uplink transmission between the communication partner and the wireless communication device; and
    a performance estimation circuit configured to update the uplink performance estimation according to a reception signal from the communication partner,
    wherein the uplink performance estimation includes at least one of transmission duration of the reception signal and throughput of the uplink transmission, the uplink adjustment information includes at least one of resource unit allocation (RU allocation), a target received signal strength indicator (target RSSI), and a target bandwidth, and the uplink setting circuit is configured to adjust at least one of the RU allocation, the target RSSI, and the target bandwidth according to the uplink performance estimation to update the uplink adjustment information.

2. The wireless communication device of claim 1, wherein before the uplink setting circuit receives the uplink performance estimation, the uplink setting circuit outputs predetermined information as the uplink adjustment information.

3. The wireless communication device of claim 1, wherein the previous uplink sounding information includes a CQI obtained through uplink sounding, an RSSI obtained through the uplink sounding, and a signal bandwidth obtained through the uplink sounding.

4. The wireless communication device of claim 1, wherein the error correction technique is a Forward Error Correction (FEC) technique.

5. The wireless communication device of claim 1, wherein the uplink transmission setting includes at least one of modulation setting and target RSSI setting.

6. The wireless communication device of claim 5, wherein the uplink transmission setting includes the modulation setting, and the modulation setting relates to at least one of the following: a modulation coding scheme (MCS); and dual carrier modulation (DCM).

7. The wireless communication device of claim 1, wherein the control signal is a trigger frame or includes the trigger frame, and the reception signal is a high efficiency trigger-based physical layer conformance procedure (PLCP) protocol data unit or includes the high efficiency trigger-based PLCP protocol data unit.

8. The wireless communication device of claim 7, wherein the trigger frame includes common fields and user fields, content of at least a part of the common fields and the user fields is based on the uplink transmission setting, and the trigger frame is used for requesting the communication partner to determine a characteristic of the reception signal according to the content.

9. The wireless communication device of claim 7, wherein the high efficiency trigger-based PLCP protocol data unit includes uplink power headroom and a minimum flag, and the uplink setting circuit generates the uplink adjustment information according to the uplink performance estimation and at least one of the uplink power headroom and the minimum flag.

10. A wireless communication method performed by a wireless communication device, wherein the wireless communication method is capable of improving uplink transmission from a communication partner to the wireless communication device, the wireless communication device is an access point (AP) and the communication partner is a non-AP station (STA), and the wireless communication method comprises:
    receiving an uplink performance estimation and then determining uplink adjustment information according to the uplink performance estimation;
    generating a target channel quality indicator (CQI) according to previous uplink sounding information and the uplink adjustment information, wherein the previous uplink sounding information indicates a characteristic of the uplink transmission;
    determining uplink transmission setting according to the target CQI and a type of an error correction technique and thereby transmitting a control signal to the communication partner according to the uplink transmission setting; and updating the uplink performance estimation according to a reception signal from the communication partner, wherein a characteristic of the reception signal is under influence of the uplink transmission setting, wherein the uplink performance estimation includes at least one of transmission duration of the reception signal and throughput of the uplink transmission, the uplink adjustment information includes at least one of resource unit allocation (RU allocation), a target received signal strength indicator (target RSSI), and a target bandwidth, and the uplink adjustment information is determined with one or more steps including: adjusting at least one of the RU allocation, the target RSSI, and the target bandwidth according to the uplink performance estimation to update the uplink adjustment information.

11. The wireless communication method of claim 10, wherein the previous uplink sounding information includes a CQI obtained through uplink sounding, an RSSI obtained through the uplink sounding, and a signal bandwidth obtained through the uplink sounding.

12. The wireless communication method of claim 10, wherein the error correction technique is a Forward Error Correction (FEC) technique.

13. The wireless communication method of claim 10, wherein the uplink transmission setting includes at least one of modulation setting and target RSSI setting.

14. The wireless communication method of claim 13, wherein the uplink transmission setting includes the modulation setting, and the modulation setting relates to at least one of the following: a modulation coding scheme (MCS); and dual carrier modulation (DCM).

15. The wireless communication method of claim 10, wherein the control signal is a trigger frame or includes the trigger frame, and the reception signal is a high efficiency trigger-based physical layer conformance procedure (PLCP) protocol data unit or includes the high efficiency trigger-based PLCP protocol data unit.

16. The wireless communication method of claim 15, wherein the trigger frame includes common fields and user fields, content of at least a part of the common fields and the user fields is based on the uplink transmission setting, and the trigger frame is used for requesting the communication partner to determine the characteristic of the reception signal according to the content.

17. The wireless communication method of claim 15, wherein the high efficiency trigger-based PLCP protocol data unit includes uplink power headroom (UPH) and a minimum flag, and the uplink adjustment information is determined with one or more steps including: determining the uplink adjustment information according to the uplink performance estimation and at least one of the uplink power headroom and the minimum flag.

* * * * *